No. 671,095. Patented Apr. 2, 1901.
M. SHIINO.
LIQUID PREPARATION FROM RICE.
(Application filed Aug. 6, 1900.)

(No Model.)

Witnesses,
E. A. Brandau
J. Anne

Inventor,
Magokichi Shiino
By Dewey Strong
Atty

UNITED STATES PATENT OFFICE.

MAGOKICHI SHIINO, OF SAN FRANCISCO, CALIFORNIA.

LIQUID PREPARATION FROM RICE.

SPECIFICATION forming part of Letters Patent No. 671,095, dated April 2, 1901.

Application filed August 6, 1900. Serial No. 26,016. (No specimens.)

*To all whom it may concern:*

Be it known that I, MAGOKICHI SHIINO, a citizen of Japan, residing in the city and county of San Francisco, State of California, have invented an Improvement in Liquid Preparations from Rice; and I hereby declare the following to be a full, clear, and exact description of the same.

My invention relates to a liquid preparation or drink which is produced from rice; and it consists of a process by which the liquid is produced, which will be more fully explained in the following specification and drawings.

Figure 1:
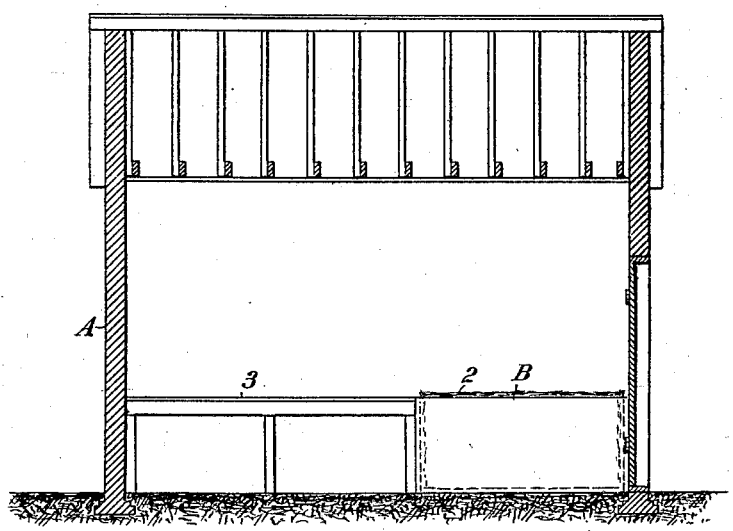
Figure 2:
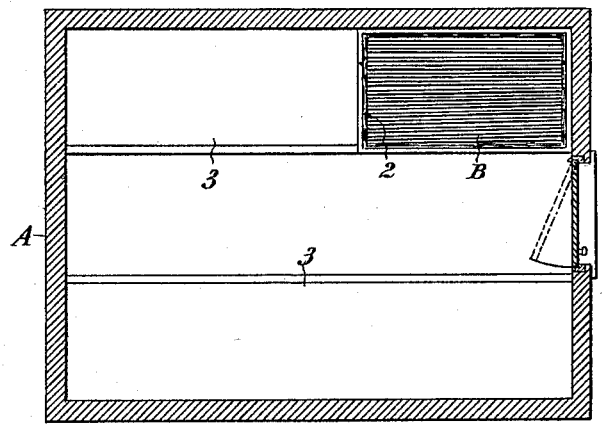
Figure 3:
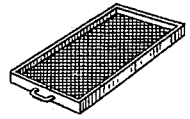

Figure 1 is a longitudinal section through the germinating-chamber. Fig. 2 is a plan of the same. Fig. 3 is a view of a tray.

In this process it is necessary to provide a germinating-chamber, as A, whose walls are of brick, dried mud, or like moisture and heat containing material and is sufficiently large for the entrance of those connected with the work. As moisture is an important element in this process, there is no floor to this chamber further than that offered by the bare earth. A bed B is made in this chamber, which ordinarily would be about two feet deep and eight feet long. This bed or box is provided with a perforated bottom, which may be made of split bamboo or leaves. Surrounding the sides of the bed is a packing 2, of straw, which keeps the temperature in the bed equable and retains the moisture. Around the walls of the chamber are arranged shelves, as B.

The preparation of this liquid includes the following steps:

First. The rice, having been polished, cleaned, and washed, is put in a suitable receptacle and steamed until it has become somewhat soft and is then allowed to cool to a temperature of about 60° Fahrenheit. Before proceeding with the next step a compound called "origin of barm" is necessary. This origin of barm is made by taking rice, steamed and cooled, as above, and mixing it with the ashes of the leaves of *Camellia japonica* in the proportion of five pounds of the latter to one hundred pounds of the steamed rice and subjecting it to the action of fermentation in the following manner: All of this mixture of steamed rice and *Camellia japonica* is placed in the bed of the germinating-chamber for approximately one hundred and twenty hours. The temperature of this chamber should be about 70° Fahrenheit. The germinating-chamber being without a floor other than the ground, as before explained, sufficient moisture is drawn up through the ground for properly carrying out the process. This "origin" thus formed is removed from the bed and ready for use in the making of the barm itself and the further preparation of the liquid.

Second. With the steamed rice or product of the first step is mixed this origin of barm in the proportion of one hundred pounds of the former to five pounds of the latter. This is spread in thin layers in shallow trays having perforated bottoms and the trays piled upon each other in the bed of the germinating-chamber. The confinement thus of the material in the bed preserves the essences, retains the moisture, and encourages fermentation. It remains in this bed for about forty-four hours at a temperature of approximately 70° Fahrenheit. This causes a partial germination, in which the rice swells, becomes white, and a small hair-like growth of mold or germs appears upon it, the whole having a sweetish taste. The trays are then removed from the bed and placed singly upon the shelves. This product is called the "barm" and can be kept for about a year, if desired.

Third. I then take about thirty pounds of rice, steamed as first described, and ten pounds of the barm which is the result of the second operation, and mix with six and one-half gallons of water. This is allowed to stand for about three hours and is then stirred at intervals for five days. This material is then kept at an even temperature of about 90° Fahrenheit, and when it arrives at the proper condition, in about forty-eight hours, it has a taste slightly sour, resembling a mixture of lemon and white wine. It is kept in a cool place at a temperature of 45° Fahrenheit until used. In this condition the material is a somewhat thick creamy liquid.

Fourth. For the next operation I take thirty pounds of rice, steamed as at first described, about six and one-fourth pounds of the barm, and mix this with one and one-half gallons of the material last produced, and then add six gallons of water. This compound is then placed in a cask or equivalent receptacle and kept for two weeks at a temperature of 45° Fahrenheit. After this the compound is separated either by decantation of the clear liquid after the thicker portion has settled or by filtration under pressure or otherwise, so as to separate the clear liquid, which can then be bottled or placed in suitable containing vessels and will be in condition for use. In this form it provides a refreshing drink.

The completed substance has a specific gravity about the same as water and is of a lemon color and of an odor somewhat resembling white wine.

Having thus described my invention, what I claim as new, and desire to secure by Letters Patent, is—

1. The process of preparing a potable liquid from rice, consisting in steaming the cleaned and polished rice, mixing it with a compound of steamed rice and the ashes of *Camellia japonica*, allowing the product to germinate, and then mixing the product with more rice, and a suitable proportion of water, allowing the compound to ferment.

2. The process of preparing a potable liquid from rice consisting in first steaming the cleaned rice; second, mixing with origin of barm, germinating this mixture in a confined and moist receptacle; third, mixing a proportion of steamed rice and this second product with water and allowing it to ferment; fourth, mixing with water proportions of the products of the second and third operations, and finally separating the clear liquid from the sedimentary residue.

3. A liquid preparation or drink obtained from rice and plant-ashes, having a specific gravity about the same as water; of a lemon color; an odor somewhat resembling white wine; and a flavor slightly acid and resembling a mixture of lemon and white wine.

In witness whereof I have hereunto set my hand at San Francisco, California, this 30th day of July, A. D. 1900.

MAGOKICHI SHIINO.

Witnesses:
H. S. FOOTE,
M. M. FOOTE.